(12) United States Patent
Ding et al.

(10) Patent No.: US 12,452,354 B2
(45) Date of Patent: Oct. 21, 2025

(54) ELECTRONIC DEVICE AND ELECTRONIC DEVICE ASSEMBLY METHOD

(71) Applicant: Honor Device Co., Ltd., Shenzhen (CN)

(72) Inventors: Ke Ding, Shenzhen (CN); Baojun Gao, Shenzhen (CN); Kuibing Zhao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/251,606

(22) PCT Filed: Sep. 9, 2022

(86) PCT No.: PCT/CN2022/118101
§ 371 (c)(1),
(2) Date: May 3, 2023

(87) PCT Pub. No.: WO2023/116069
PCT Pub. Date: Jun. 29, 2023

(65) Prior Publication Data
US 2024/0357029 A1 Oct. 24, 2024

(30) Foreign Application Priority Data
Dec. 23, 2021 (CN) .......................... 202111593214.0

(51) Int. Cl.
*H04M 1/18* (2006.01)
*H04M 1/02* (2006.01)
*H04N 23/55* (2023.01)

(52) U.S. Cl.
CPC ....... *H04M 1/0283* (2013.01); *H04M 1/0264* (2013.01); *H04N 23/55* (2023.01)

(58) Field of Classification Search
CPC .... H04M 1/0264; H04M 1/0283; H04M 1/18; H04N 23/55
(Continued)

(56) References Cited

U.S. PATENT DOCUMENTS

| 2019/0057242 A1* | 2/2019 | Guo | ........................ G06V 40/12 |
| 2019/0068767 A1* | 2/2019 | Liu | ..................... H04M 1/0283 |
| 2022/0377163 A1* | 11/2022 | Li | ............................ H04M 1/18 |

FOREIGN PATENT DOCUMENTS

| CN | 208890914 U | 5/2019 |
| CN | 209659416 U | 11/2019 |

(Continued)

OTHER PUBLICATIONS

IP.com search history (Year: 2025).*

*Primary Examiner* — Moustapha Diaby

(57) ABSTRACT

An electronic device and an electronic device assembly method. A through hole is provided in a rear cover. An inner wall of the through hole protrudes to form an annular flange. A camera decorative member is designed to include an inner decorative member and an outer decorative member. The outer decorative member is arranged on a side of the rear cover facing away from a middle frame and is connected to the annular flange by a bonding layer, and the inner decorative member is fastened to a side of the outer decorative member facing the middle frame, so that a gap between the outer decorative member and the annular flange can be blocked by the bonding layer, and the bonding layer is used for sealing to prevent water in an external environment from entering the electronic device through space between the outer decorative member and the rear cover.

16 Claims, 14 Drawing Sheets

(58) Field of Classification Search
USPC .................................................... 455/575.1
See application file for complete search history.

(56) References Cited

FOREIGN PATENT DOCUMENTS

| | | |
|---|---|---|
| CN | 112533430 A | 3/2021 |
| CN | 112615951 A | 4/2021 |
| CN | 213028126 U | 4/2021 |
| CN | 213879944 U | 8/2021 |
| CN | 213960134 U | 8/2021 |
| CN | 214101431 U | 8/2021 |
| CN | 215187020 U | 12/2021 |
| CN | 115022437 A | 9/2022 |
| WO | 2021052090 A1 | 3/2021 |

* cited by examiner

ELECTRONIC DEVICE AND ELECTRONIC DEVICE ASSEMBLY METHOD

CROSS-REFERENCE TO RELATED APPLICATIONS

This application is a national stage of International Application No. PCT/CN2022/118101, filed on Sep. 9, 2022, which claims priority to Chinese Patent Application No. 202111593214.0, filed on Dec. 23, 2021. The disclosures of both of the aforementioned applications are hereby incorporated by reference in their entireties.

TECHNICAL FIELD

This application relates to the field of mobile terminal technologies, and in particular, to an electronic device and an electronic device assembly method.

BACKGROUND

A camera module is usually arranged inside an electronic device. A camera decorative member is arranged around the camera module. The camera decorative member is fixedly connected to a rear cover of the electronic device to decorate the camera module. During use, the electronic device is often exposed in an environment with water. For example, a user places the electronic device on a sink when washing hands. Water is likely to splash on the electronic device and enters the electronic device through space between the camera decorative member and the rear cover, resulting in a short circuit in the electronic device. Therefore, how to implement waterproofing has become an urgent problem to be resolved for an electronic device.

SUMMARY

Embodiments of this application provide an electronic device and an electronic device assembly method. The electronic device has good sealing performance and can implement waterproofing, to resolve the problem that water in an external environment enters the electronic device through space between a rear cover and a camera decorative member and causes a short circuit in the electronic device.

In a first aspect, the embodiments of this application provide an electronic device, including: a middle frame, a rear cover, and a camera decorative member, where
  the rear cover is arranged on a side of the middle frame, a through hole is provided in the rear cover, and an inner wall of the through hole protrudes toward a center of the through hole to form an annular flange; and
  the camera decorative member includes an inner decorative member and an outer decorative member, the outer decorative member is mounted on a side of the annular flange facing away from the middle frame, a part of the outer decorative member is arranged in the through hole and is connected to the annular flange by a bonding layer, and a part of the inner decorative member is arranged in the through hole and is fastened to a side of the outer decorative member facing the middle frame.

In the electronic device provided in the embodiments of this application, a through hole is provided in a rear cover. An inner wall of the through hole protrudes to form an annular flange. A camera decorative member is designed to include an inner decorative member and an outer decorative member. The outer decorative member is arranged on a side of the rear cover facing away from a middle frame. The inner decorative member is arranged between the outer decorative member and the middle frame and is connected to the outer decorative member. The outer decorative member is bonded to the annular flange by a bonding layer. The bonding layer can block a gap between the outer decorative member and the annular flange to implement sealing and waterproofing. In this way, the yield of an air tightness test of the rear cover can be further improved.

In a possible embodiment, the inner decorative member includes a first structural member and an extension edge, the extension edge is connected to a surrounding edge of the first structural member, and a thickness of the first structural member is greater than a thickness of the extension edge; and the first structural member protrudes into an inner hole defined by the annular flange and is connected to the outer decorative member, and the extension edge is opposite to a surface of the annular flange facing the middle frame.

In a possible embodiment, a first gap is provided between the first structural member and an inner wall of the annular flange.

In a possible embodiment, a second gap is provided between the extension edge and the surface of the annular flange facing the middle frame.

In a possible embodiment, the first gap is greater than or equal to 0.05 mm and less than or equal to 0.2 mm.

In a possible embodiment, the outer decorative member includes a second structural member and an appearance member, and the appearance member is connected to a surrounding edge of the second structural member and is arranged protruding toward a side facing away from the middle frame.

In a possible embodiment, the electronic device further includes a lens, where the lens is connected to the second structural member, and the appearance member is arranged surrounding the lens.

In a possible embodiment, the outer decorative member is in clearance fit with a hole wall of the through hole.

In a possible embodiment, the inner decorative member is connected to the side of the outer decorative member facing the middle frame by an adhesive layer.

In a possible embodiment, the inner decorative member is fixedly connected to the outer decorative member by a screw.

In a possible embodiment, a plurality of screws are provided, and the plurality of screws are evenly distributed around a center line of the through hole.

In a possible embodiment, three screws are provided, and the three screws are distributed in a regular triangle shape.

In a second aspect, the embodiments of this application provide an electronic device assembly method, including:
  providing a middle frame;
  providing a rear cover, the rear cover being arranged on a side of the middle frame, where a through hole is provided in the rear cover, and an inner wall of the through hole protrudes toward a center of the through hole to form an annular flange;
  providing a camera decorative member, where the camera decorative member includes an inner decorative member and an outer decorative member; arranging the outer decorative member on a side of the rear cover facing away from the middle frame, and connecting the outer decorative member to the annular flange of the rear cover by a bonding layer; and arranging the inner decorative member on a side of the rear cover facing the middle frame, and fastening the inner decorative member to the outer decorative member.

In a possible embodiment, the fastening the inner decorative member to the outer decorative member includes: providing a plurality of screws, and connecting the inner decorative member to the outer decorative member by the plurality of screws, where the plurality of screws are evenly distributed around a center line of the through hole.

In a possible embodiment, before the providing a plurality of screws, the method further includes: connecting the inner decorative member to the outer decorative member by an adhesive layer.

In a possible embodiment, after the fastening the inner decorative member to the outer decorative member, the method further includes: providing a lens, where the lens is mounted on a second structural member of the outer decorative member, and an appearance member of the outer decorative member is arranged around the lens.

Figure 1:
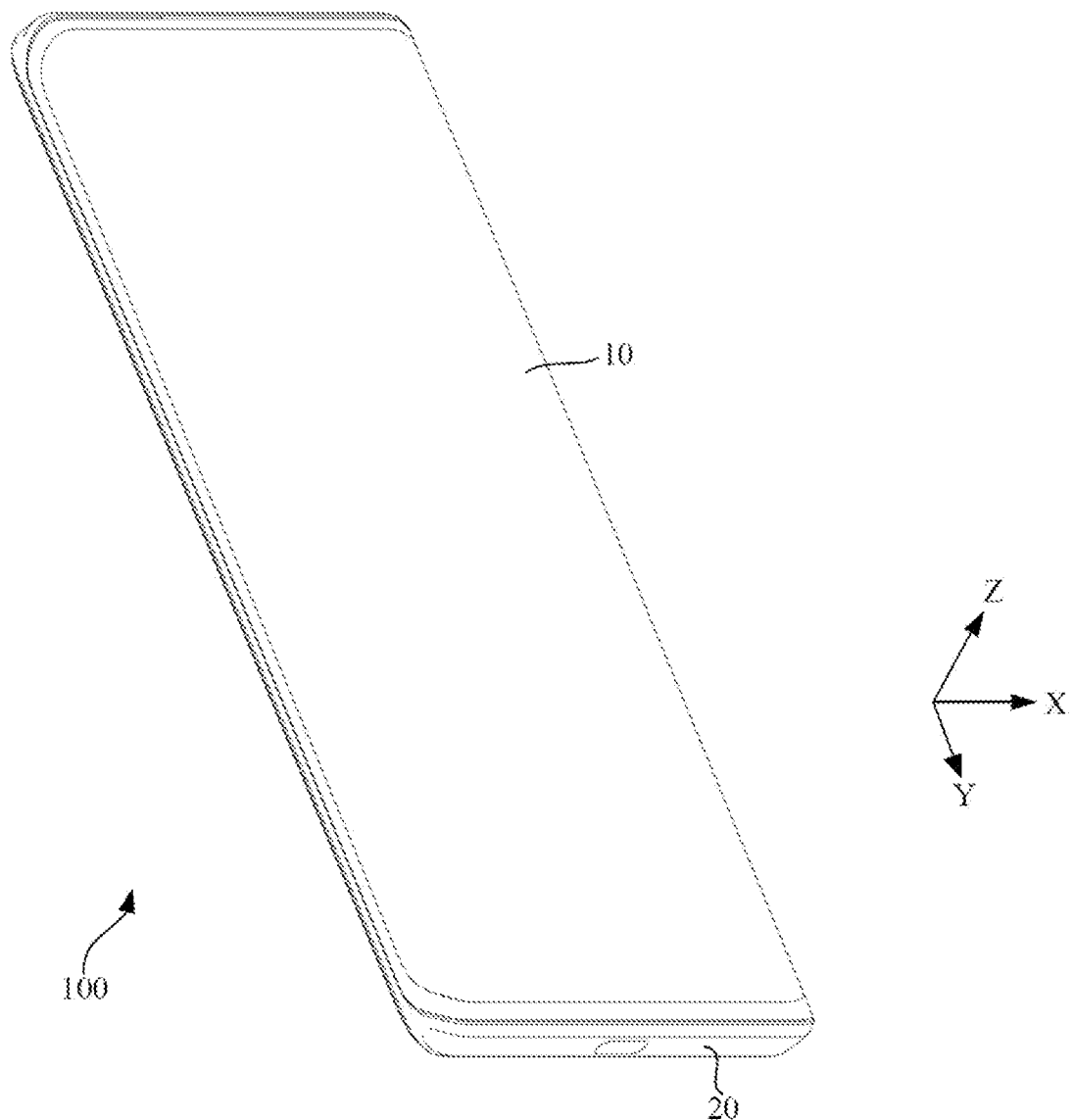
FIG. 1 is a schematic structural diagram of an electronic device according to an embodiment of this application.

REFERENCE NUMERALS 100. electronic device;
10. display screen;
20. middle frame; 21. middle plate; 22. frame;
30. rear cover; 31. through hole; 32. annular flange;
40. camera decorative member;
41. inner decorative member; 411. first structural member; 412. extension edge; 413. fixing hole;
42. outer decorative member; 421. second structural member; 422. appearance member; 423. threaded hole;
43. adhesive layer;
50. camera module; 51. lens; 511. light transmitting hole; 512. light shielding film; 52. optical device;
60. circuit board;
70. bonding layer; 71. avoidance hole;
80. screw; and
90. working bench jig.

DESCRIPTION OF EMBODIMENTS

The following specifically describes the structure of an electronic device and a method for assembling same provided in embodiments of this application with reference to the accompanying drawings in the embodiments of this application. Apparently, the described embodiments are a part rather than all of the embodiments of this application.

Embodiment 1

FIG. 1 is a schematic structural diagram of an electronic device 100 from a first perspective. The embodiments of this application provide an electronic device 100. The electronic device 100 is not limited to a mobile phone shown in FIG. 1, and may be a tablet computer, a notebook computer, an ultra-mobile personal computer (ultra-mobile personal computer, UMPC), a handheld computer, a walkie-talkie, a netbook, a POS machine, a personal digital assistant (personal digital assistant, PDA), a wearable device, a virtual reality device, a wireless USB flash drive, a Bluetooth speaker, a Bluetooth headset, an in-vehicle device, or another electronic device 100 having a camera. For ease of understanding, the following embodiments are described by using an example in which the electronic device 100 is a mobile phone. It should be noted that, in the accompanying drawings of the embodiments of this application, directions of an X-axis, a Y-axis, and a Z-axis respectively represent a width direction, a length direction, and a thickness direction of the electronic device 100.

Figure 2:
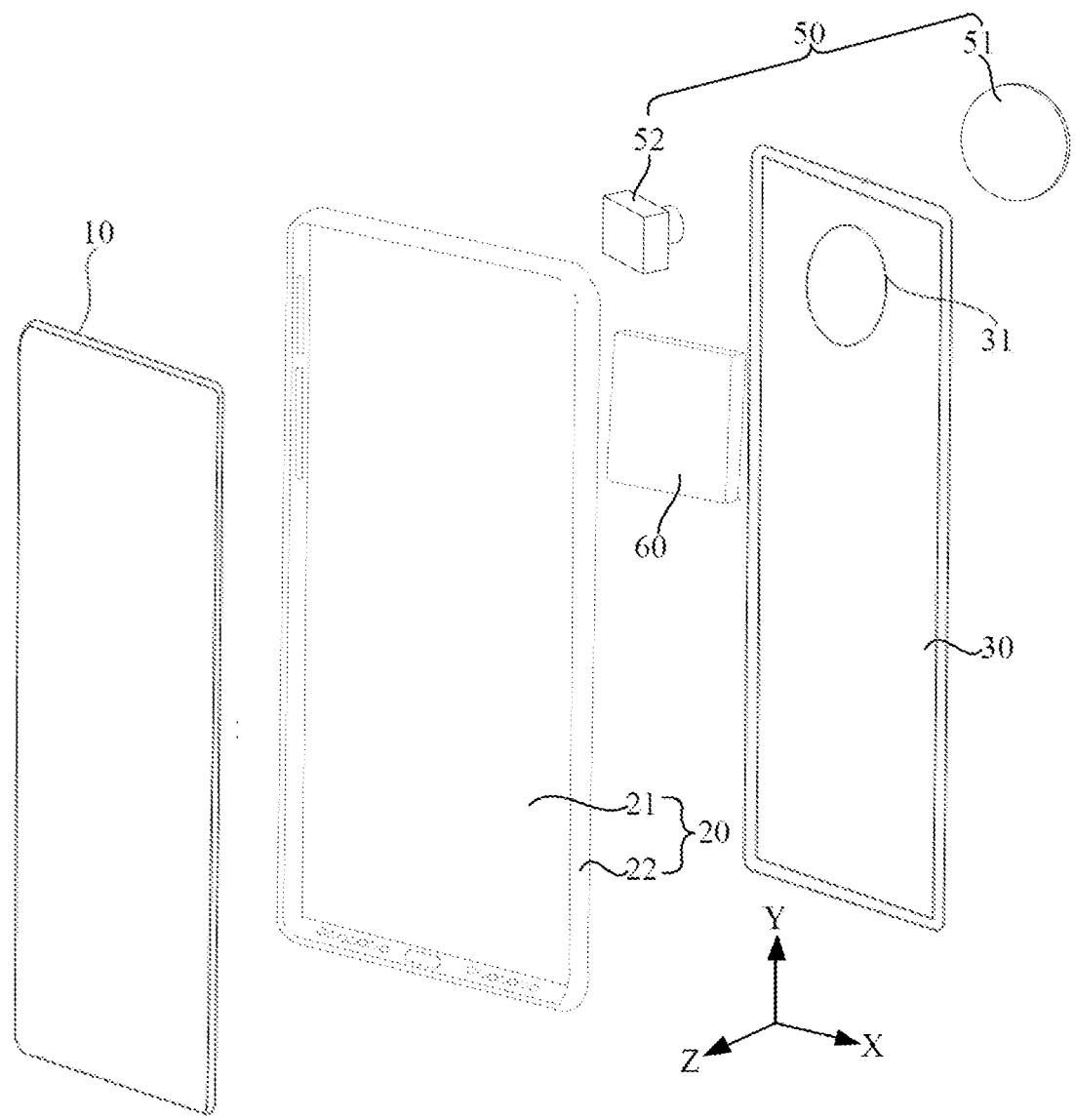
FIG. 2 is a schematic exploded view of FIG. 1.

FIG. 2 schematically shows the exploded structure of the electronic device 100. Referring to FIG. 2, the electronic device 100 includes a middle frame 20, a display screen 10, and a rear cover 30. The middle frame 20 includes a middle plate 21 and a frame 22. The frame 22 is arranged on a surrounding edge of the middle plate 21. The display screen 10 and the rear cover 30 are respectively arranged on two sides of the middle plate 21 in a thickness direction of the middle plate 21, and are opposite to the middle plate 21. The middle frame 20 is used for carrying the display screen 10. When a user uses the electronic device 100, the display screen 10 faces the user, and the rear cover 30 faces away from the user.

The middle frame 20 may be made of metal, ceramic, glass, or another material. The rear cover 30 may be made of metal, ceramic, glass, or another material. The middle frame 20 and the rear cover 30 may be separately formed and fixed by welding, clamping, bonding, or another manner. Alternatively, the middle frame 20 and the rear cover 30 may be integrally formed. The rear cover 30 made of a material such as metal, ceramic or glass can meet the requirements of gloss, fashion, and aesthetics of the appearance of the electronic device 100. In addition, compared with the rear cover 30 made of glass, the rear cover 30 made of ceramic further has advantages of high hardness, fast heat dissipation, and easy processing.

Figure 3:
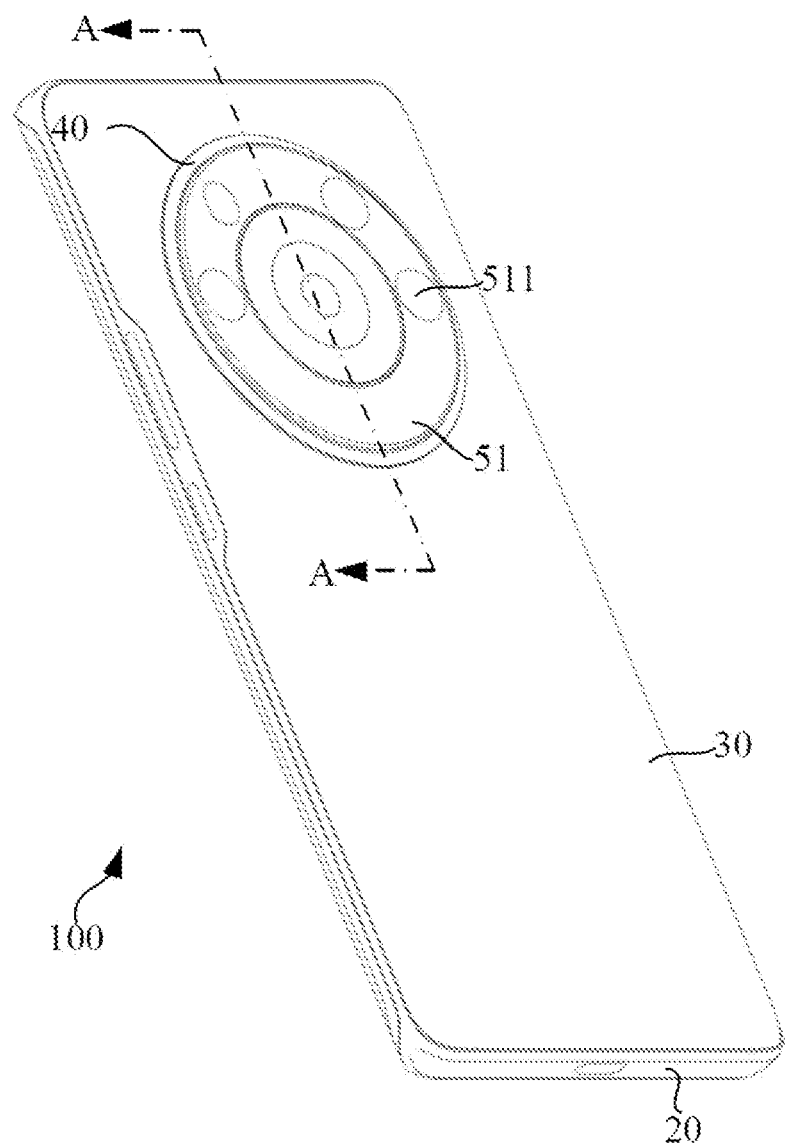
FIG. 3 is a schematic structural diagram of an electronic device according to an embodiment of this application from a second perspective.

FIG. 3 is a schematic structural diagram of an electronic device 100 from a second perspective. Referring to FIG. 2 and FIG. 3, a camera module 50 is further provided inside the electronic device 100, a through hole 31 is provided in the rear cover 30, and a part of the camera module 50 extends into the through hole 31, so that the camera module 50 is exposed to an external environment of the rear cover 30 and can be configured to acquire an image of the external world, thereby achieving shooting.

The through hole 31 may be provided at any position in the rear cover 30. For example, the through hole 31 may be provided at an upper central position in the rear cover 30 shown in FIG. 3, or may be, for example, provided at an upper right corner in the rear cover 30 or a position near the upper left corner. It is designed that the shape and size of the through hole 31 can match the shape and size of the camera module 50. For example, the through hole 31 may be a circular hole, a rectangular hole, or an elongated hole.

The camera module 50 may be configured protruding relative to an outer surface of the rear cover 30 facing away from the middle frame 20, so that a thickness of the electronic device 100 at a position corresponding to the camera module 50 is greater than a thickness at another position, so that space on the electronic device 100 for accommodating the camera module 50 is increased while a thickness requirement of the entire device is satisfied.

The electronic device 100 further includes a circuit board 60. The circuit board 60 is mounted on a side of the middle plate 21 facing the rear cover 30. The camera module 50 specifically includes a lens 51 and an optical device 52. The optical device 52 is fixedly connected to the circuit board 60, and the lens 51 is fixedly connected to the rear cover 30 and is exposed to the external environment of the rear cover 30, so that external light passes through the lens 51 to enter the optical device 52 or light emitted by the optical device 52 passes through lens 51 to reach the external environment to implement a shooting function.

The shape of the lens 51 is not specifically limited in this embodiment. For example, the shape may be a circle shown in FIG. 2, or a rectangle, a rhombus, or another irregular shape. A light transmitting hole 511 corresponding to the optical device 52 is provided in the lens 51. External light enters the camera module 50 through the light transmitting hole 511, to allow the camera module 50 to implement a video recording function. The arrangement manner and area of a plurality of light transmitting holes 511 in the lens 51 are limited by the position and size of the optical device 52 in the camera module 50. The lens 51 may be made of transparent glass or plastic. An inner surface of the lens 51 may be covered with an opaque light shielding film 512 (referring to FIG. 5 below) through a process such as screen printing. The light shielding film 512 may be made of, for example, ink or mylar. The light transmitting hole 511 is formed in a region that is not covered by the light shielding film 512.

Figure 4:
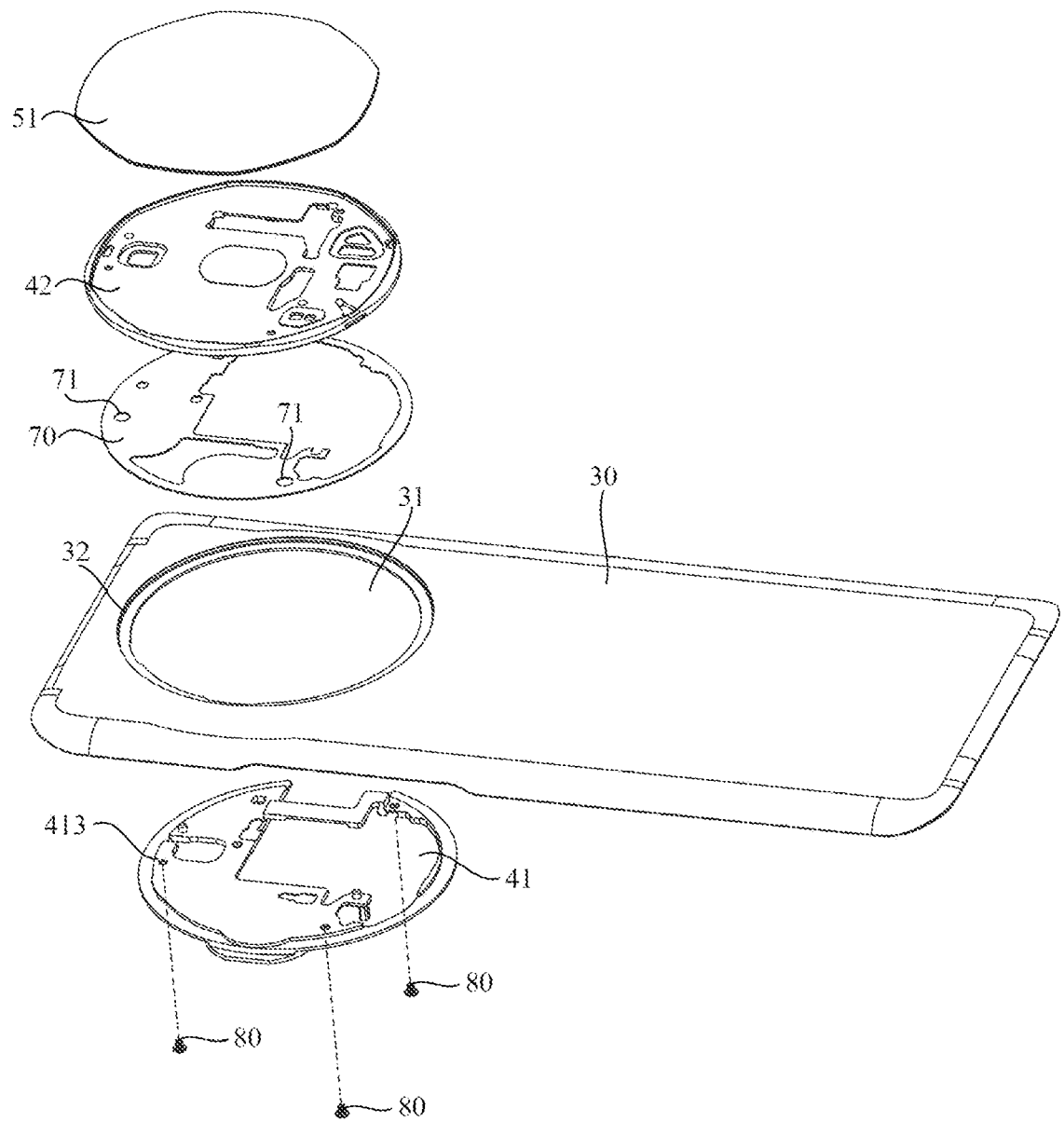
FIG. 4 is a schematic exploded view of a rear cover and a camera decorative member according to an embodiment of this application.
Figure 5:
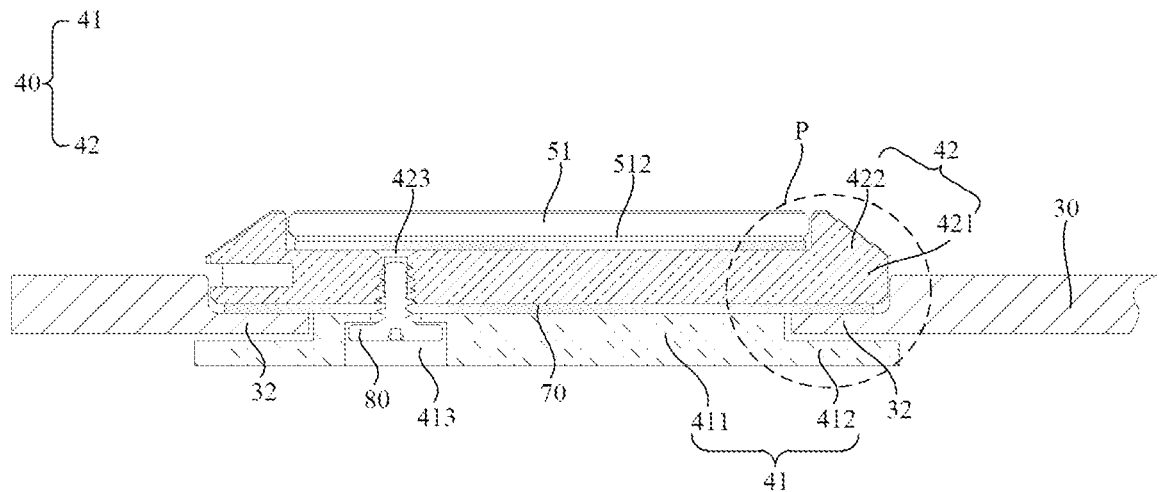
FIG. 5 is a partial schematic cross-sectional view of an electronic device according to an embodiment of this application in a direction A-A.

Continuing to refer to FIG. 3, a camera decorative member 40 is further provided inside the electronic device 100. The camera decorative member 40 is disposed surrounding the camera module 50 to decorate the camera module 50, thereby increasing the aesthetics of the entire electronic device 100. FIG. 4 schematically shows the exploded structure of a rear cover 30 and a camera decorative member 40. FIG. 5 schematically shows a structure in a direction A-A shown in FIG. 4. Referring to FIG. 4 and FIG. 5, the camera decorative member 40 may specifically include an outer decorative member 42 and an inner decorative member 41. The outer decorative member 42 is arranged on an outer side of the rear cover 30 facing away from the middle frame 20. The inner decorative member 41 is arranged between the outer decorative member 42 and the middle frame 20. The inner decorative member 41 is fastened to a surface of the outer decorative member 42 facing the middle frame 20. It may be seen that in this embodiment, the camera decorative member 40 is designed to mainly include the outer decorative member 42 and the inner decorative member 41, and the inner decorative member 41 is arranged on an inner side the outer decorative member 42, so that the inner decorative member 41 is not exposed to the external environment and the outer decorative member 42 is exposed to the external environment. Compared with that both the inner decorative member 41 and the outer decorative member 42 are exposed to the external environment, the overall visual effect of the electronic device 100 is more minimalist.

Figure 6:
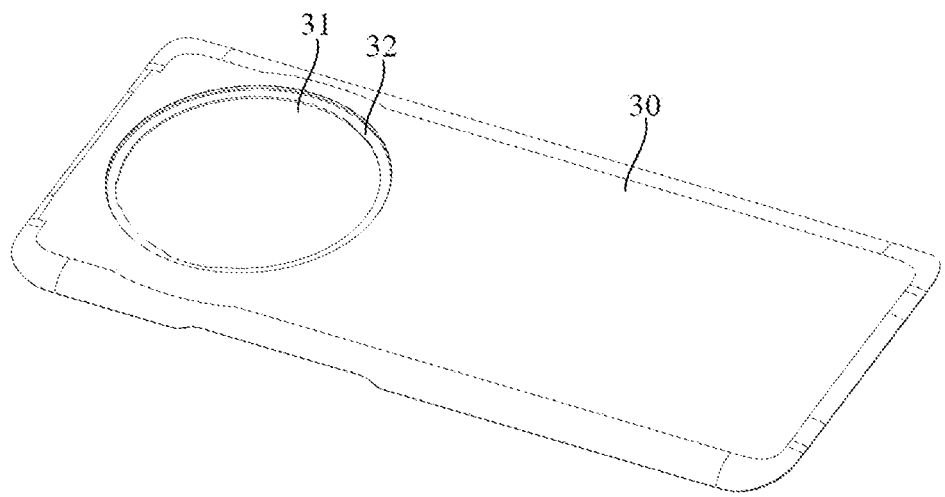
FIG. 6 is a schematic structural diagram of a rear cover according to an embodiment of this application.

FIG. 6 schematically shows the structure of a rear cover 30 of an electronic device 100. Specifically, as shown in FIG. 6, a hole wall of the through hole 31 in the rear cover 30 protrudes toward a center line of the through hole 31 to form an annular flange 32. The annular flange 32 does not block the through hole 31, so that the camera module 50 can pass through the through hole 31 to ensure that the camera module 50 can be exposed to the external environment. It should be understood that, an inner wall of the annular flange 32 may define an inner hole. The inner hole can allow the camera module 50 to pass through. The shape and size of the annular flange 32 can adapt to the shape and size of the camera module 50.

That the outer decorative member 42 is provided on an outer side of the rear cover 30 specifically means that the outer decorative member 42 is mounted on a side of the annular flange 32 facing away from the middle frame 20 and the outer decorative member 42 is connected to a surface of the annular flange 32 facing away from the middle frame 20. For details, reference may be made to FIG. 4 and FIG. 5. The annular flange 32 may be arranged close to an inner surface of the rear cover 30 facing the middle frame 20, so that a surface of the annular flange 32 facing the middle frame 20 is coplanar with the inner surface of the rear cover 30. Alternatively, in some implementations, it may be designed that a distance exists between the surface of the annular flange 32 facing the middle frame 20 and the inner surface of the rear cover 30 and it may be designed that a distance exists between the surface of the annular flange 32 facing away from the middle frame 20 and the outer surface of the rear cover 30. That is, the annular flange 32 is arranged in the middle of the hole wall of the through hole 31. In this way, a part of the outer decorative member 42 can be arranged in the through hole 31. Compared with that the surface of the annular flange 32 facing away from the middle frame 20 is coplanar with the outer surface of the rear cover 30 and the outer decorative member 42 is completely arranged outside the through hole 31, the outer decorative member 42 can be prevented from being excessively obtrusive to avoid affecting the overall visual effect of the electronic device 100. Certainly, a part of the inner decorative member 41 may be arranged in the through hole 31, so that both the inner decorative member 41 and the outer decorative member 42 are embedded in the through hole 31.

The outer decorative member 42 may be designed to be completely arranged in the through hole 31. Alternatively, as shown in FIG. 4 and FIG. 5, the outer decorative member 42 may have a part protruding from the through hole 31, so that a part of the outer decorative member 42 is arranged protruding relative to the outer surface of the rear cover 30. In the implementation in which both the camera module 50 and the outer decorative member 42 are arranged protruding from the outer surface of the rear cover 30, the part of the outer decorative member 42 protruding from the through hole 31 may be designed to be equivalent to a part of the camera module 50 protruding to the through hole 31, so that the surface of the outer decorative member 42 facing away from the rear cover 30 is flush with the surface of the camera module 50 facing away from the rear cover 30. Alternatively, in a direction of the center line of the through hole 31, the size of the part of the outer decorative member 42 protruding from the through hole 31 may be slightly larger than the size of the part of the camera module 50 protruding from the through hole 31. In this way, the outer decorative member 42 can protect the camera module 50. In a case that the electronic device 100 falls on the ground and the rear cover 30 faces the ground, the camera module 50 is kept from colliding with the ground under the protection of the outer decorative member 42, which helps to protect the camera module 50 from damage.

Specifically, the outer decorative member 42 may be fastened to the surface of the annular flange 32 facing away from the middle frame 20 by a bonding layer 70. In this way, the bonding layer 70 can connect the outer decorative member 42 and the rear cover 30 and can implement sealing. The bonding layer 70 can prevent dust and water in the external environment from entering the interior of the electronic device 100 from space between the outer decorative member 42 and the annular flange 32, thereby preventing water from eroding the internal circuit of the electronic device 100 to protect the internal circuit from damage, so that waterproofing is implemented between the camera decorative member 40 and the rear cover 30. The thickness of the bonding layer 70 is not limited. For example, the thickness of the bonding layer 70 may be greater than 1 μm and less than or equal to 10 μm.

The bonding layer 70 may be arranged on the surface of the annular flange 32 facing away from the middle frame 20, or may be arranged on the surface of the outer decorative member 42 facing the middle frame 20. Alternatively, in some embodiments, the bonding layer 70 may be provided on both the surface of the annular flange 32 facing away from the middle frame 20 and the surface of the outer decorative member 42 facing the middle frame 20.

In the electronic device 100 provided in this embodiment of this application, a through hole 31 is provided in a rear cover 30. An inner wall of the through hole 31 protrudes to form an annular flange 31. A camera decorative member 40 is designed to include an inner decorative member 41 and an outer decorative member 42. The outer decorative member 42 is arranged on a side of the rear cover 30 facing away from the middle frame 20. The inner decorative member 41 is arranged between the outer decorative member 42 and the middle frame 20 and is connected to the outer decorative member 42. The outer decorative member 42 is bonded to the annular flange 31 by a bonding layer 70. The bonding layer 70 can block a gap between the outer decorative member 42 and the annular flange 32 to prevent water in the external environment from entering the electronic device 100 through the space between the outer decorative member 42 and the rear cover 30, so that sealing and waterproofing are implemented, and the yield of an air tightness test of the rear cover 30 can be further effectively improved.

It should be further noted that, to make the electronic device 100 implement waterproofing, those skilled in the art often easily conceive of designing the camera decorative member 40 to include an annular assembly ring and a connecting plate. The annular assembly ring is formed protruding on the connecting plate. The annular assembly ring surrounds the camera module 50. The connecting plate is bonded to the inner surface of the rear cover 30 by an adhesive. In this way, the adhesive between the connecting plate and the inner surface of the rear cover 30 can implement sealing, thereby implementing waterproofing. However, in a case that the electronic device 100 is dropped and the camera module 50 collides with the ground, the camera module 50 and the camera decorative member 40 suffer a huge impact force. The camera decorative member 40 moves toward the interior of the electronic device 100 under the action of the impact force. The adhesive is pulled and the connecting plate tends to fall off from the rear cover 30. In this case, the adhesive cannot implement sealing, resulting in a loss of waterproof performance of the electronic device 100, and the camera decorative member 40 is loose and is likely to fall into the interior of the electronic device 100.

In this embodiment, the camera decorative member 40 is designed to include the inner decorative member 41 and the outer decorative member 42. The outer decorative member 42 is arranged on an outer side of the rear cover 30. The outer decorative member 42 and the outer surface of the rear cover 30 are bonded by the bonding layer 70. The inner decorative member 41 is arranged on the side of the outer decorative member 42 facing the rear cover 30 and is connected to the outer decorative member 42. In this way, in the process that the user uses the electronic device 100, the electronic device 100 does not lose waterproof performance when the electronic device 100 falls on the ground because the user fails to hold the electronic device 100 tightly.

Figure 7:
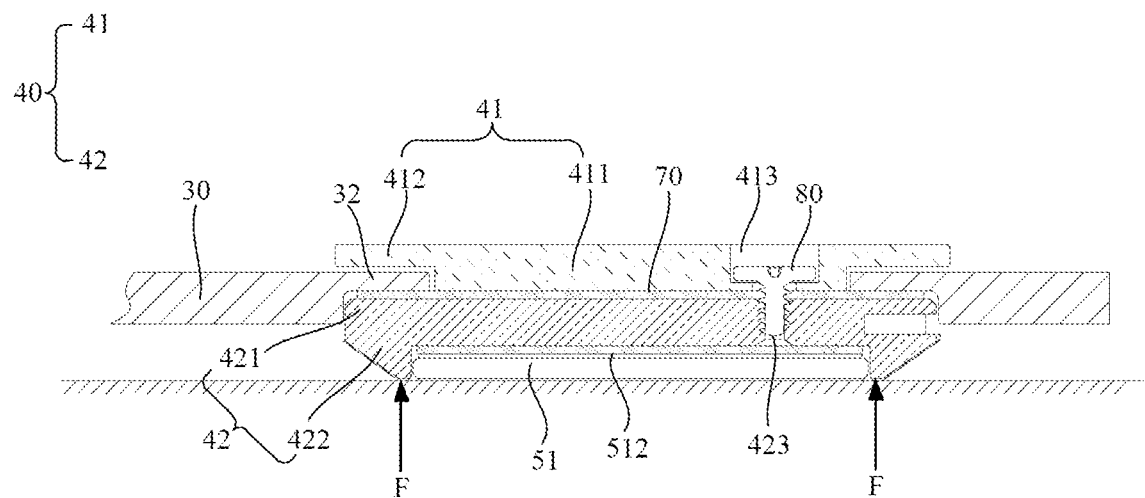
FIG. 7 is a diagram of a scenario in which the electronic device shown in FIG. 5 falls on the ground and a camera decorative member collides with the ground.

FIG. 7 is a schematic diagram of a scenario in which an electronic device falls on the ground and a camera decorative member 40 collides with the ground. Specifically, as shown in FIG. 7, if the rear cover 30 faces the ground when the electronic device 100 falls, the outer decorative member 42 is located below the inner decorative member 41. The electronic device 100 applies a force to the ground when the electronic device 100 collides with the ground. At this time, the electronic device 100 is subjected to a counterforce F, and the counterforce Facts on the outer decorative member 42, so that the outer decorative member 42 tends to move toward the inner decorative member 41. Correspondingly, the bonding layer 70 is pressed by the outer decorative member 42, so that the outer decorative member 42 and the bonding layer 70 are more firmly bonded. If the display screen 10 faces the ground and collides with the ground when the electronic device 100 falls, the outer decorative member 42 is located above the inner decorative member 41. In this case, although the outer decorative member 42 is not subjected to external pressure, the gravity of the outer decorative member 42 acts on the bonding layer 70, making the bonding layer 70 compressed, so that the outer decorative member 42 and the bonding layer 70 are more firmly bonded. In addition, at the instant when the electronic device 100 comes into contact with the ground, the outer decorative member 42 tends to move toward the inner decorative member 41 under inertia, and the outer decorative member 42 further compresses the bonding layer 70, making the bonding layer 70 more reliable.

It can be seen that if the electronic device 100 in this embodiment falls on the ground, regardless of whether the rear cover 30 or the display screen 10 collides with the ground, the outer decorative member 42 presses the bonding layer 70. There is no risk that the adhesive between the outer decorative member 42 and the rear cover 30 falls off, and the bonding layer 70 can still implement sealing, so that after the electronic device 100 is dropped, waterproofing can still be implemented between the camera decorative member 40 and the rear cover 30, to allow the dropped electronic device 100 to maintain the waterproof performance, thereby avoiding the problem that after use for a period of time, because the electronic device 100 has been dropped and loses waterproof performance, water tends to enter to cause a short circuit. In addition, a bonding effect between the outer decorative member 42 and the rear cover 30 is enhanced, and the inner decorative member 41 is connected to the outer decorative member 42, so that the camera decorative member 40 and the rear cover 30 are still tightly bonded together, which helps to prevent the camera decorative member 40 from falling off from the rear cover 30.

Figure 8:
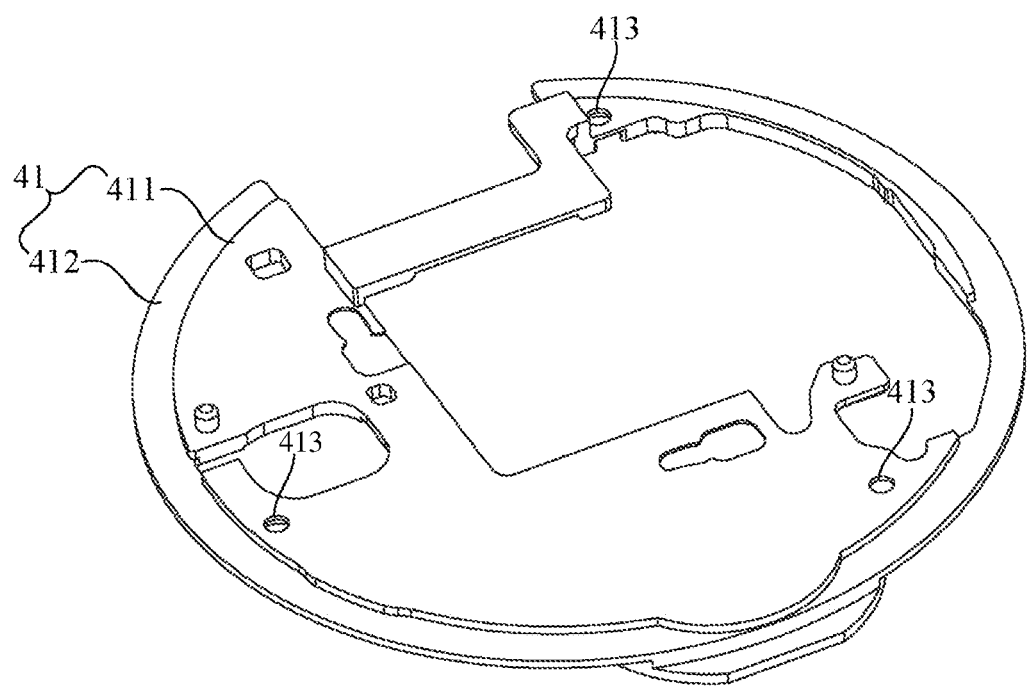
FIG. 8 is a schematic structural diagram of an inner decorative member according to an embodiment of this application.
Figure 9:
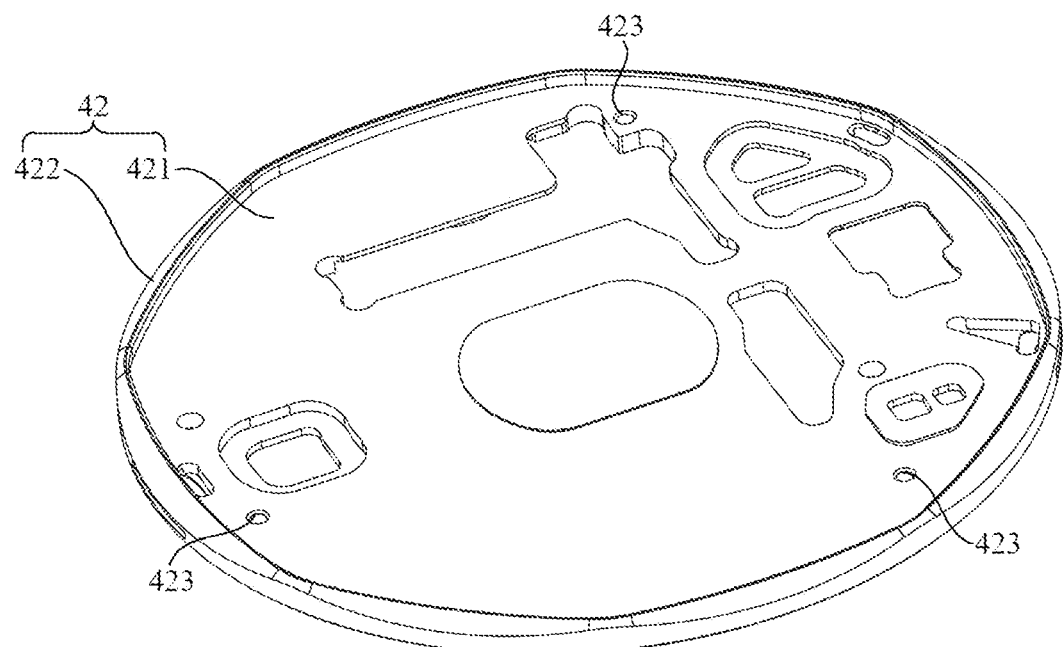
FIG. 9 is a schematic structural diagram of an outer decorative member according to an embodiment of this application.

FIG. 8 schematically shows the structure of an inner decorative member 41. FIG. 9 schematically shows the structure of an outer decorative member 42. For example, as shown in FIG. 8 and FIG. 9, the inner decorative member 41 may include a first structural member 411, and the outer decorative member 42 may include a second structural member 421. The second structural member 421 and the annular flange 32 are bonded by the bonding layer 70. The first structural member 411 is firmly connected to the second structural member 421. The first structural member 411 and the second structural member 421 are both plate-shaped as a whole. The material of the first structural member 411 and the second structural member 421 is not limited to aluminum or an aluminum alloy, and may be plastic. Plastic has the advantage of a light weight and, which helps to reduce the weight of the camera decorative member 40. Based on this embodiment, the implementation in which a part of the inner decorative member 41 and a part of the outer decorative member 42 are arranged in the through hole 31 has the following possible cases:

In a first case, as shown in FIG. 5, a surface of the second structural member 421 facing the middle frame 20 is a plane. The second structural member 421 does not extend into the inner hole. The first structural member 411 extends into the inner hole to be connected to the second structural member 421.

Figure 10:
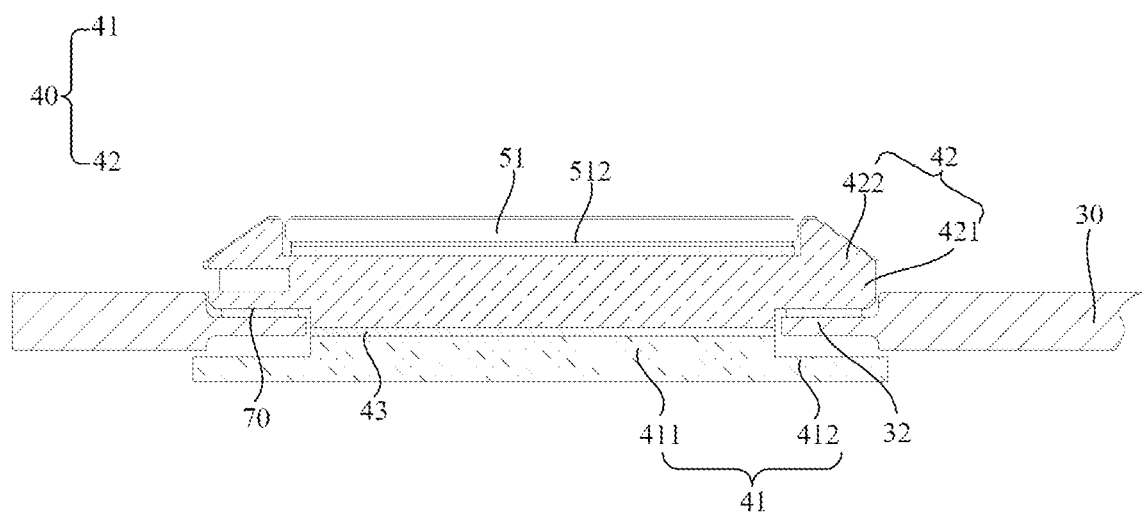
FIG. 10 is a partial schematic cross-sectional view of another electronic device according to an embodiment of this application in a direction A-A.

In a second case, a protrusion (not shown) that protrudes toward the middle frame 20 is provided on the surface of the second structural member 421 facing the middle frame 20. The protrusion extends into the inner hole. The first structural member 411 also extends into the inner hole and is connected to the protrusion of the second structural member 421. FIG. 10 schematically shows a cross-sectional structure of another rear cover 30 and a camera decorative member 40.

In a third case, as shown in FIG. 10, a protrusion that protrudes toward the middle frame 20 is provided on the surface of the second structural member 421 facing the middle frame 20. The protrusion extends into the inner hole. The first structural member 411 is arranged on a side of the annular flange 32 facing the middle frame 20 and does not extend into the inner hole. The first structural member 411 is connected to the protrusion of the second structural member 421.

It may be configured that the inner decorative member 41 cannot pass through the through hole 31. Specifically, as shown in FIG. 4 and FIG. 8, the inner decorative member 41 may include an extension edge 412. The extension edge 412 is connected to a surrounding edge of the first structural member 411. When the inner decorative member 41 is connected to the outer decorative member 42, the first structural member 411 is directly opposite to the through hole 31. The extension edge 412 is opposite to a surface of the annular flange 32 facing the middle frame 20, and then the annular flange 32 can block the extension edge 412, so that the inner decorative member 41 cannot pass through the through hole 31. In a case that the first structural member 411 extends into the inner hole (that is, the first case and the second case), a thickness of the first structural member 411 may be greater than a thickness of the extension edge 412, so that a step is formed on the inner decorative member 41, and the step can fit the annular flange 32. Certainly, in a case that the first structural member 411 does not extend into the inner hole (that is, the third case), the thickness of the first structural member 411 may be equal to the thickness of the extension edge 412.

Through the above arrangement, when the electronic device 100 falls on the ground, the camera decorative member 40 does not easily fall off from the rear cover 30 even if being subjected to a huge impact force, so that the mounting stability of the camera decorative member 40 is high. The principle that the camera decorative member 40 does not easily fall off is as follows: If the display screen 10 faces the ground when the electronic device 100 falls, correspondingly, the inner decorative member 41 is close to the ground, and the annular flange 32 can be used for supporting the outer decorative member 42. Blocked by the annular flange 32, the outer decorative member 42 cannot cross the annular flange 32 to move to the side of the rear cover 30 facing the middle frame 20, and the camera decorative member 40 is kept from falling off from the through hole 31 and falling into the interior of the electronic device 100. If the rear cover 30 faces the ground when the electronic device 100 falls, correspondingly, the outer decorative member 42 is close to the ground and can be used for supporting the inner decorative member 41. Blocked by the annular flange 32, the inner decorative member 41 cannot go over the annular flange 32 and move to the side of the rear cover 30 facing away from the middle frame 20, and the camera decorative member 40 is kept from falling off from the through hole 31 and falling into the exterior of the electronic device 100.

Figure 11:
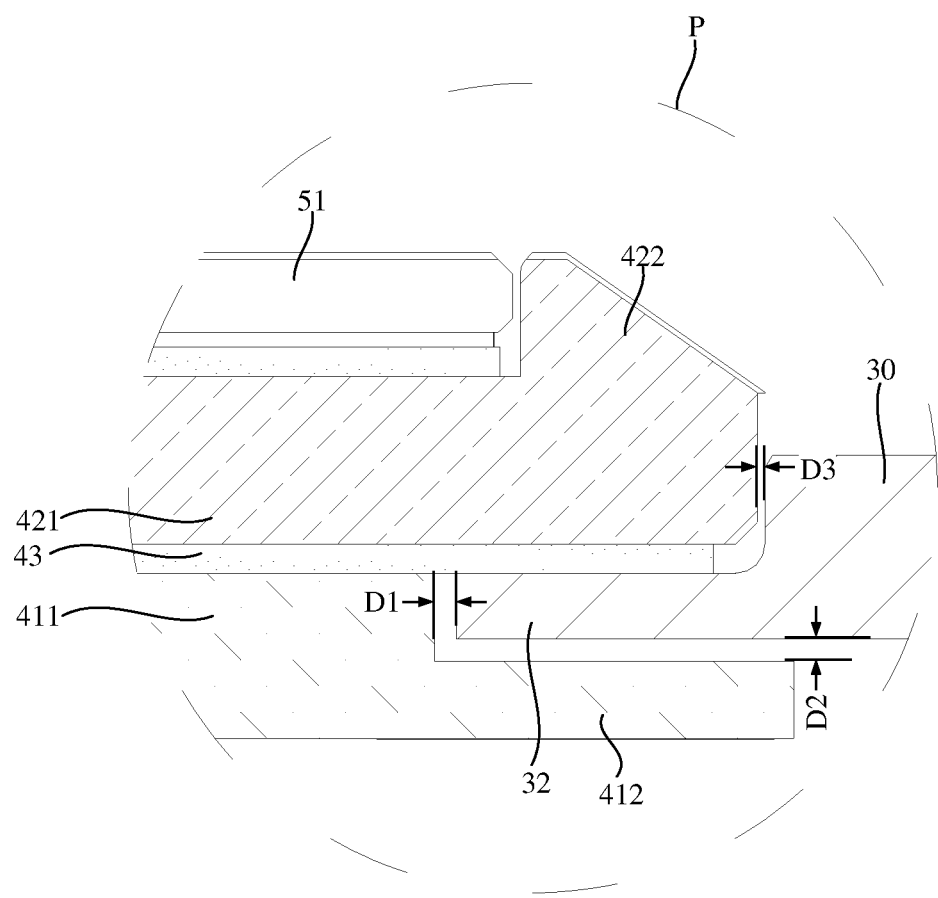
FIG. 11 is a partial enlarged view at P in FIG. 5.

The inner decorative member 41 and the annular flange 32 may be designed to be in clearance fit. FIG. 11 is schematically a partial enlarged view at P in FIG. 5. In some implementations, as shown in FIG. 5, FIG. 8, and FIG. 11, when the inner decorative member 41 includes the first structural member 411 and the extension edge 412 and the first structural member 411 extends into the annular flange 32, a first gap D1 is provided between the first structural member 411 and an inner wall of the annular flange 32.

It should be understood that, to improve the connection reliability between the camera decorative member 40 and the rear cover 30, those skilled in the art tend to easily conceive of designing the first structural member 411 to be in an interference fit with the annular flange 32. However, in this design, when the first structural member 411 is mounted on the rear cover 30, it is often necessary to use a mounting jig to squeeze the first structural member 411 into the annular flange 32, resulting in low mounting efficiency. In this embodiment, the first structural member 411 is designed to be in clearance fit with the inner wall of the annular flange 32. During the mounting of the camera decorative member 40, when the inner decorative member 41 is connected to the outer decorative member 42, there is no interference between the inner decorative member 41 and the annular flange 32. The first structural member 411 can extend into the annular flange 32 without a mounting jig. The mounting operation is simple, which helps to improve the mounting efficiency and reduce the mounting cost.

The first gap D1 is not specifically limited in this embodiment. For example, the first gap D1 may be greater than 0.05 mm and less than 0.5 mm. For example, the first gap D1 may be 0.05 mm, 0.1 mm, 0.15 mm, 0.2 mm, or 0.5 mm. In this way, based on the clearance fit between the first structural member 411 and the annular flange 32 for easy mounting, the first gap D1 is further prevented from being excessively large, the size of the first structural member 411 is prevented from being excessively small, so that the inner decorative member 41 can surround the outside of the camera module 50.

It may further be configured that a second gap D2 is provided between the extension edge 412 and the surface of the annular flange 32 facing the middle frame 20. In other words, when the inner decorative member 41 is connected to the outer decorative member 42, the extension edge 412 does not contact the surface of the annular flange 32 facing the middle frame 20. In this design, the second gap D2 provides an assembly gap between the extension edge 412 and the annular flange 32 to avoid assembly interference, so that in a process of mounting the inner decorative member 41, the inner decorative member 41 is kept from applying a pressure to the rear cover 30 in the process of connecting the first structural member 411 to the second structural member 421. The second gap D2 is also not limited in this embodiment. For example, the second gap D2 may be equal to the first gap D1. That is, in the implementation in which the first gap D1 is greater than or equal to 0.05 mm and less than 0.5 mm, the second gap D2 may also be greater than or equal to 0.05 mm and less than 0.5 mm. Specifically, the second gap D2 may be 0.05 mm, 0.1 mm, 0.15 mm, 0.2 mm, or 0.5 mm.

In addition to the second structural member 421, the outer decorative member 42 may further include an appearance member 422. The appearance member 422 is connected to a surrounding edge of the second structural member 421, and the appearance member 422 is arranged protruding toward a side facing away from the middle frame 20. The lens 51 may be fastened to the second structural member 421. The appearance member 422 surrounds the outside of the lens 51 of the camera module 50. The lens 51 may be bonded to the second structural member 421 by a bonding agent. In this way, in this example, the appearance member 422 is designed to expose the appearance member 422 to the external environment of the rear cover 30 to decorate the lens 51. An outer surface of the appearance member 422 can present a metallic color with texture, and the presented color can be implemented by processes such as spraying, electroplating, corrosion, or the like. In addition, the color of the appearance member 422 may be the same as the color of the lens 51. Alternatively, in some examples, the color and pattern of the appearance member 422 may be the same as the color and pattern of the outer surface of the rear cover 30 respectively. In this way, the appearance member 422 can present the same visual effect as the lens 51 or the rear cover 30, to prevent the appearance member 422 from being excessively obtrusive visually.

The appearance member 422 and the hole wall of the through hole 31 may be designed to be in clearance fit. That is, a third gap D3 is provided between the appearance member 422 and the through hole 31. In this way, first, the third gap D3 provides an assembly gap between the outer decorative member 42 and the rear cover 30 to avoid assembly interference, and the outer decorative member 42 can be connected to the annular flange 32 without a mounting jig, so that the mounting efficiency is high. Second, the outer decorative member 42 is prevented from being squeezed to deform during the mounting. The third gap D3 is also not limited in this embodiment. For example, the third gap D3 may be greater than or equal to 0.03 mm and less than 0.1 mm. Specifically, the third gap D3 may be 0.03 mm, 0.05 mm, or 0.1 mm.

In the above embodiment, the fastening connection manner between the inner decorative member 41 and the outer decorative member 42 is not limited to an adhesive connection in this embodiment, and may be a screw connection. When the adhesive connection method is used, as shown in FIG. 10, the inner decorative member 41 and the outer decorative member 42 are bonded by an adhesive layer 43. The adhesive layer 43 may be provided on a surface of the inner decorative member 41 facing away from the middle frame 20 or may be provided on a surface of the outer decorative member 42 facing the middle frame 20, or the adhesive layer 43 may be provided on both the surface of the inner decorative member 41 facing away from the middle frame 20 and the surface of the outer decorative member 42 facing the middle frame 20. With reference to FIG. 5, it should be noted that, when both the bonding layer 70 and the adhesive layer 43 are provided on the outer decorative member 42, the bonding layer 70 and the adhesive layer 43 may be formed as a whole. Specifically, during the mounting, the outer decorative member 42 may be coated to form the bonding layer 70 and the adhesive layer 43 in one mounting process.

When the inner decorative member 41 is screwed to the outer decorative member 42, specifically, a fixing hole 413 may be provided in the first structural member 411 of the inner decorative member 41, and a threaded hole 423 may be provided in the second structural member 421 of the outer decorative member 42. An axis of the threaded hole 423 is collinear with an axis of the fixing hole 413, and a screw 80 passes through the fixing hole 413 to fit the threaded hole 423, so that the inner decorative member 41 and the outer decorative member 42 are screwed together.

Certainly, in some implementations, the inner decorative member 41 and the outer decorative member 42 may be bonded together by the adhesive layer 43 and at the same time may be screwed together by the screw 80, which helps to improve the reliability of a connection relationship between the inner decorative member 41 and the outer decorative member 42. In addition, in the implementation in which the inner decorative member 41 and the outer decorative member 42 are connected by bonding and screwing, an avoidance hole 71 may be further provided in the adhesive layer 43, and the avoidance hole 71 can expose both the fixing hole 413 and the threaded hole 423 instead of being covered by the adhesive layer 43.

A plurality of screws 80 may be provided. That is, the outer decorative member 42 and the inner decorative member 41 are connected by the plurality of screws 80. For example, the number of the screws 80 may be 2, 3, or 4. The outer decorative member 42 and the inner decorative member 41 are connected more tightly by increasing the number of screws 80. In some implementations, the plurality of screws 80 may be evenly distributed around a center line of the through hole 31. In this way, it can be ensured that the camera decorative member 40 is evenly stressed, which helps to avoid a risk that a part of the outer decorative member 42 warps in a direction away from the rear cover 30 due to being not fastened and further prevent the bonding layer 70 from being pulled as the outer decorative member 42 warps, to minimize a risk that the bonding layer 70 is detached from the outer decorative member 42 or the rear cover 30, so that good waterproof performance can be maintained between the rear cover 30 and the camera decorative member 40.

It should be pointed out that, to avoid interference between the camera module 50 and the screw 80, the optical device 52 of the camera module 50 is arranged based on that the screw 80 can be avoided. In other words, in this embodiment, an arrangement of a screw joint on the camera decorative member 40 is considered first, and then a mounting position of the camera module 50 is arranged, so that the camera decorative member 40 is evenly stressed. In this way, the stability of the camera decorative member 40 is high. Therefore, the camera module 50 can be stably fixed on the camera decorative member 40.

Figure 12:
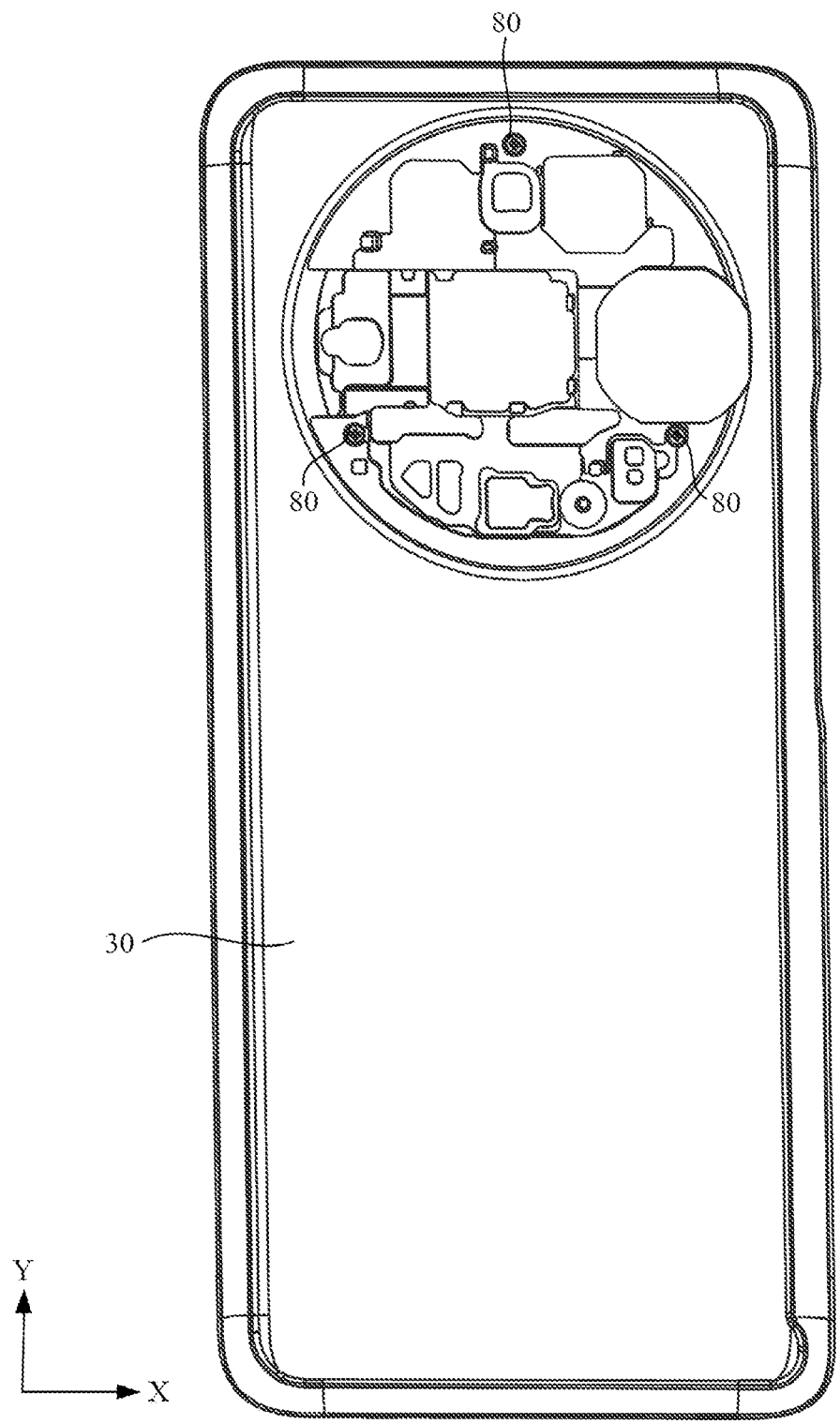
FIG. 12 is a schematic diagram showing fitting between a rear cover and a camera decorative member according to an embodiment of this application.

FIG. 12 schematically shows engagement relationship between the camera decorative member 40 and the rear cover 30. Specifically, referring to FIG. 12, when three screws 80 are provided, the three screws 80 may be arranged in a regular triangle shape. In a feasible manner, an angle between a line connecting centers of any two screws 80 of the three screws 80 and a horizontal line may be an acute angle. That is, the regular triangle formed by the three screws 80 is not symmetrically provided with respect to a vertical symmetry plane of the electronic device 100. The vertical symmetry plane is perpendicular to the display screen 10 and the ground. In this way, the camera decorative member 40 is evenly stressed, and any one of the three screws 80 is not arranged at a position right above or below a center of the through hole 31, so that the optical device 52 of the camera module 50 can be arranged at a position directly above or below the center of the through hole 31.

Embodiment 2

This embodiment of this application provides a method for assembling an electronic device 100, which is applied in an assembly stage of the electronic device 100 described in Embodiment 1, and is mainly used for mounting a camera decorative member 40 on a rear cover 30.

Figure 13:
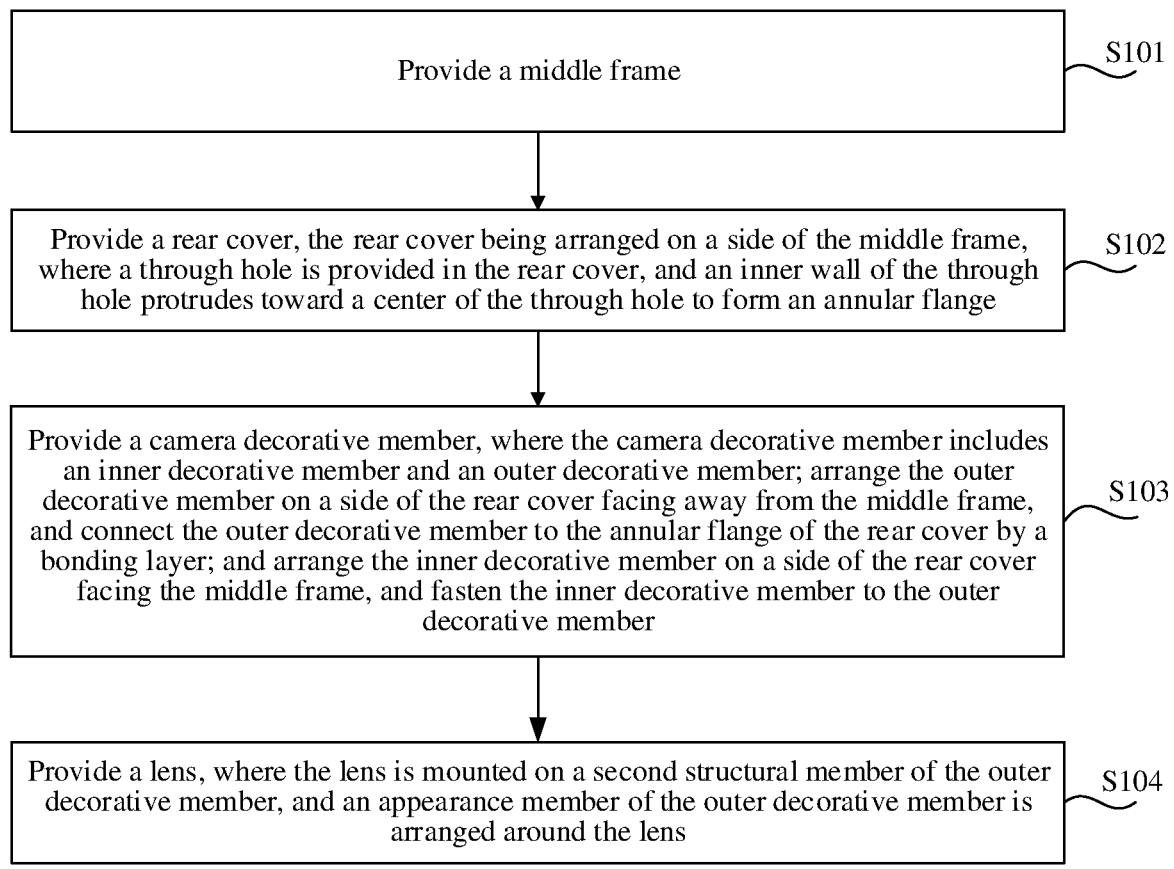
FIG. 13 is a flowchart of an electronic device assembly method according to an embodiment of this application.

FIG. 13 schematically shows a procedure of a method for assembling an electronic device 100. Referring to FIG. 13, the method for assembling the electronic device 100 mainly includes the following steps:

Step S101: Provide the middle frame 20.

Step S102: Provide the rear cover 30, the rear cover 30 being arranged on a side of the middle frame 20, where a through hole 31 is provided in the rear cover 30, and an inner wall of the through hole 31 protrudes toward a center of the through hole 31 to form an annular flange 32. The through hole 31 can provide space for mounting a camera module 50 and a camera decorative member 40 of the electronic device 100.

Step S103: Provide the camera decorative member 40, where the camera decorative member 40 includes an inner decorative member 41 and an outer decorative member 42; arrange the outer decorative member 42 on a side of the rear cover 30 facing away from the middle frame 20, and connect the outer decorative member 42 to the annular flange 32 of the rear cover 30 by a bonding layer 70; and arrange the inner decorative member 41 on a side of the rear cover 30 facing the middle frame 20, and fasten the inner decorative member 41 to the outer decorative member 42. The purpose of this step is to mount the camera decorative member 40 on the rear cover 30.

Figure 14:
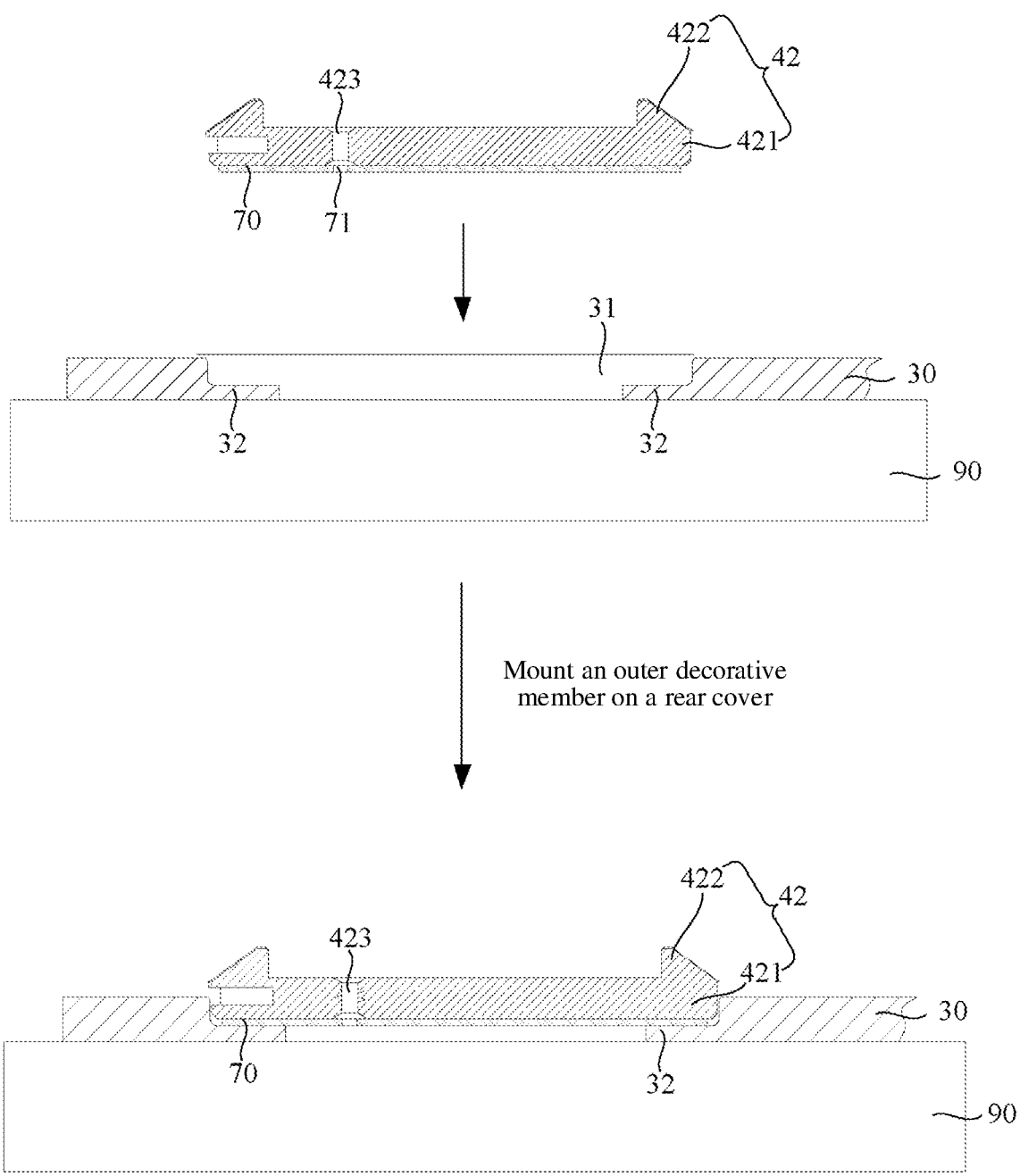
FIG. 14 is a schematic diagram of an outer decorative member being mounted on a rear cover according to an embodiment of this application.

In step S103, it is necessary to first mount the outer decorative member 42 on the rear cover 30. FIG. 14 schematically shows an assembly process of an outer decorative member 42 and a rear cover 30. Specifically, as shown in FIG. 14, the outer decorative member 42 may be first moved to face the annular flange 32, so that the outer decorative member 42 can be accurately mounted on the annular flange 32.

In addition, the bonding layer 70 in step S103 needs to be pre-coated on the outer decorative member 42 or the annular flange 32. For example, the bonding layer 70 is coated on the outer decorative member 42. The bonding layer 70 may be coated on the outer decorative member 42 after the outer decorative member 42 is provided and before the outer decorative member 42 is arranged on the side of the rear cover 30 facing away from the middle frame 20, so that the outer decorative member 42 arranged on the side of the rear cover 30 facing away from the middle frame 20 can be bonded to the annular flange 32. Alternatively, the outer decorative member 42 may be coated with an adhesive to form the bonding layer 70 after the outer decorative member 42 is arranged on the side of the rear cover 30 facing away from the middle frame 20. In a case that the bonding layer 70 is coated on the annular flange 32, an operation of coating the bonding layer 70 only needs to be performed before the step of connecting the outer decorative member 42 to the annular flange 32 of the rear cover 30 by a bonding layer 70, which is not limited in this embodiment.

The outer decorative member 42 is in clearance fit with a hole wall of the through hole 31. Therefore, during the mounting, a part of the outer decorative member 42 may be extended into the through hole 31 without a mounting jig, thereby connecting the outer decorative member 42 to the annular flange 32.

It should be further noted that, when the outer decorative member 42 is mounted on the rear cover 30, the rear cover 30 may be disposed on a working bench jig 90 in a horizontal posture with an inner surface facing the ground and an outer surface facing away from the ground. The outer decorative member 42 moves from top to bottom into the through hole 31 and is connected to the rear cover 30 by the bonding layer 70. The working bench jig 90 is used for supporting the rear cover 30, to facilitate the mounting operation. The working bench jig 90 may be, for example, a table.

In this way, it is more convenient to mount the outer decorative member 42 from top to bottom than to mount the outer decorative member 42 from bottom to top. In addition, it may be understood that in the process of bonding the outer decorative member 42 to the rear cover 30, pressure is often applied to the outer decorative member 42 to make the outer decorative member 42 and the rear cover 30 firmly bonded. However, the rear cover 30 is placed on the working bench jig 90, the working bench jig 90 can support the rear cover 30, so that the rear cover 30 can stably bear the pressure applied by the outer decorative member 42 on the rear cover 30 during the mounting, and the mounting reliability is high.

Figure 15:
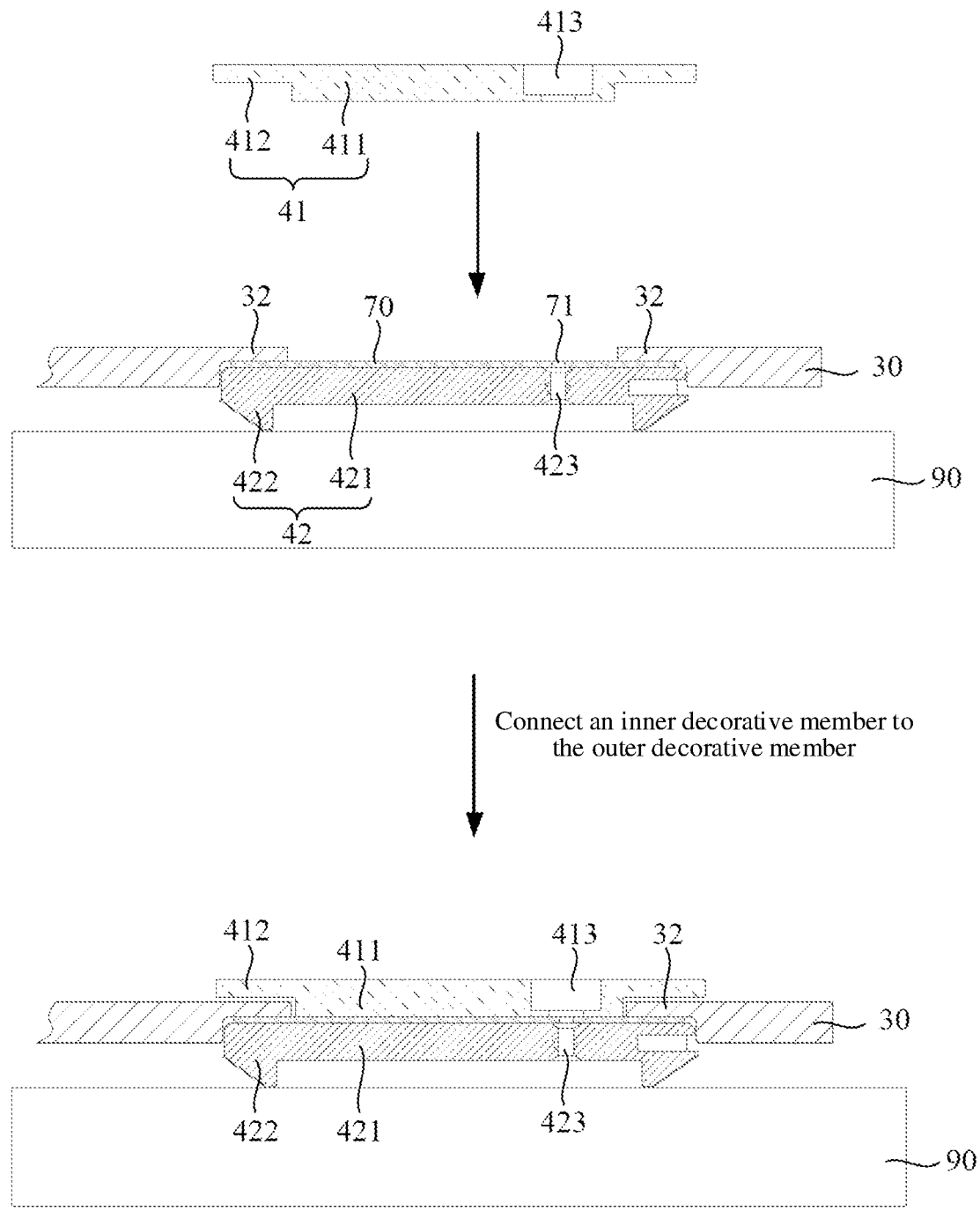
FIG. 15 is a schematic diagram of an inner decorative member being mounted on an outer decorative member according to an embodiment of this application.

After the mounting of the outer decorative member 42 is completed, the inner decorative member 41 is mounted on the rear cover 30. FIG. 15 schematically shows an assembly process of the inner decorative member 41 and the outer decorative member 42.

In some implementations, a specific implementation of fastening the inner decorative member 41 to the side of the outer decorative member 42 facing the annular flange 32 may be: providing a plurality of screws 80, and connecting the inner decorative member 41 to the outer decorative member 42 by the plurality of screws 80, where the plurality of screws 80 are evenly distributed around a center line of the through hole 31. Therefore, the inner decorative member 41 and the outer decorative member 42 are screwed together, and the camera decorative member 40 is stressed evenly.

Before the plurality of screws 80 are provided, when the inner decorative member 41 is fastened to the side of the outer decorative member 42 facing the annular flange 32, the inner decorative member 41 may be further connected to the outer decorative member 42 by the adhesive layer 43. With such an arrangement, the inner decorative member 41 and the outer decorative member 42 are bonded together based on being connected by the screw 80, to improve the reliability of the connection between the inner decorative member 41 and the outer decorative member 42, thereby improving the stability of the camera decorative member 40.

It should be noted that, when the inner decorative member 41 is mounted on the rear cover 30, the rear cover 30 may be in a horizontal posture with the outer surface facing the ground and the inner surface facing away from the ground. That is, the rear cover 30 pre-mounted with the outer decorative member 42 shown in FIG. 14 is flipped by 180°, so that the outer decorative member 42 is located below the rear cover 30 and is in contact with the working bench jig 90. The working bench jig 90 can support the outer decorative member 42 and the rear cover 30, and then the inner decorative member 41 moves from top to bottom into the through hole 31 to be connected to the outer decorative member 42, to facilitate the mounting operation.

It may be understood that, in the implementation in which the inner decorative member 41 and the outer decorative member 42 are screwed and bonded, the connecting the inner decorative member 41 to the outer decorative member 42 from top to bottom may be specifically implemented by using the following steps:

Step 1: Apply the adhesive layer 43 on the outer decorative member 42 or the inner decorative member 41. In a case that both the bonding layer 70 and the adhesive layer 43 are provided on the outer decorative member 42, step 1 may be completed in a process of mounting the outer decorative member 42 to the rear cover 30, so that the bonding layer 70 and the adhesive layer 43 are applied on the outer decorative member 42 in one process. In addition, during the application of the adhesive layer 43, it is necessary to avoid the threaded hole 423 in the outer decorative member 42 and the fixing hole 413 in the inner decorative member 41 to prevent the threaded hole 423 and the fixing hole 413 from being blocked.

Step 2: Place the inner decorative member 41 on the side of the rear cover 30 facing the middle frame 20, align the fixing hole 413 with the threaded hole 423, and move the inner decorative member 41 to bond the inner decorative member 41 and the outer decorative member 42 by the adhesive layer 43.

Figure 16:
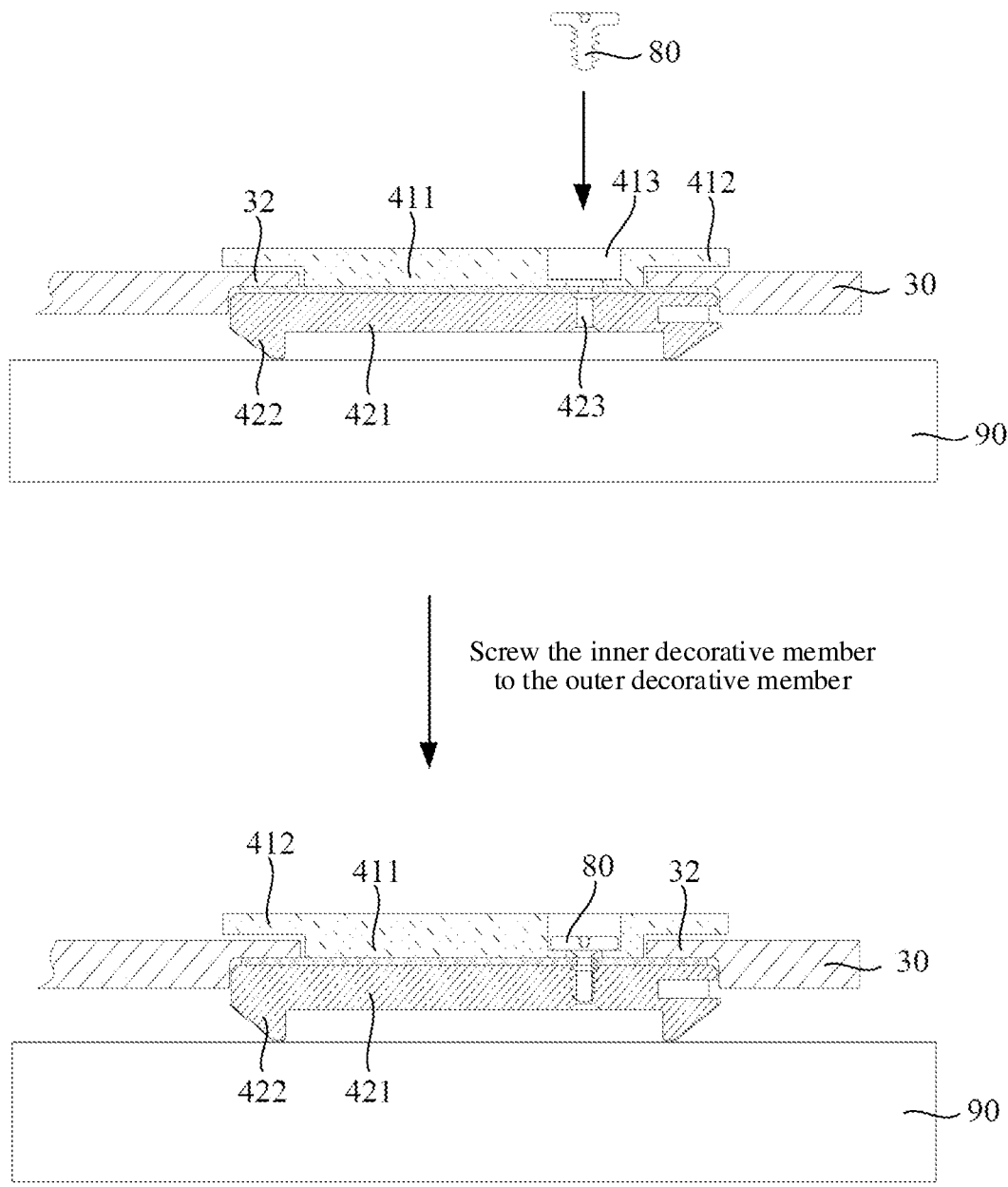
FIG. 16 is a schematic diagram of an inner decorative member being screwed to an outer decorative member according to an embodiment of this application.

Step 3: Place the screw 80 on the side of the rear cover 30 facing the middle frame 20, and align the screw 80 with the fixing hole 413, to make the screw 80 pass through the fixing hole 413 to be screwed to the threaded hole 423. FIG. 16 schematically shows a screwing process of the inner decorative member 41 and the outer decorative member 42. For the implementation of step 3, reference may be made to FIG. 16.

It should be understood that, in the process of bonding the inner decorative member 41 to the outer decorative member 42, pressure is often applied to the inner decorative member 41 to make the inner decorative member 41 and the outer decorative member 42 bond firmly. During the screw connection of the inner decorative member 41 and the outer decorative member 42, the screwing of the screw 80 also applies pressure on the inner decorative member 41. It may be seen that during the mounting of the inner decorative member 41, the rear cover 30 and the outer decorative member 42 are subjected to a certain pressure. The rear cover 30 pre-mounted with the outer decorative member 42 is flipped by 180° and placed on the working bench jig 90, and the working bench jig 90 may support the outer decorative member 42 and the rear cover 30, so that the rear cover 30 and the fixed outer decorative member 42 can stably bear the pressure applied on the inner decorative member 41 during the mounting, so that the reliability of the mounting is high. In addition, during the mounting of the inner decorative member 41, the working bench jig 90 can abut against the outer decorative member 42, and the outer decorative member 42 abuts against the bonding layer 70 in turn, so that the bonding layer 70 does not fall off from the outer decorative member 42 or the rear cover 30, and the outer decorative member 42 and the rear cover 30 may maintain a stable connection relationship. After the mounting is completed, waterproofing can still be implemented between the rear cover 30 and the camera decorative member 40.

The inner decorative member 41 may also be in clearance fit with the rear cover 30. Therefore, during the mounting, the part of the inner decorative member 41 may extend into the through hole 31 without a mounting jig, to facilitate the mounting of the inner decorative member 41 on the outer decorative member 42, so that the mounting efficiency is high.

In summary, in the assembly method provided in the embodiments of this application, the outer decorative member 42 and the annular flange 32 are bonded through step S101, and the bonding layer 70 can block the gap between the outer decorative member 42 and the annular flange 32, to prevent water in the external environment from entering the electronic device 100 through the space between the outer decorative member 42 and the rear cover 30, so that sealing and waterproofing are implemented, and the yield of an air tightness test of the rear cover 30 can be effectively improved at the same time.

In addition, in a case that the electronic device 100 assembled by using the assembly method in this embodiment falls on the ground, the rear cover 30 of the electronic device 100 faces the ground or the display screen 10 collides with the ground, the outer decorative member 42 does not move in the direction away from the rear cover 30, so that the bonding layer 70 is kept from being pulled along with the movement of the outer decorative member 42, and the bonding layer 70 can still tightly connect the outer decorative member 42 and the rear cover 30. In this way, the camera decorative member 40 can further be stably mounted on the rear cover 30 and prevented from falling off, and a liquid such as water in the external environment is prevented from entering the electronic device 100 through the bonding layer 70, to allow the dropped electronic device 100 to maintain the waterproof performance, thereby avoiding the problem that after use for a period of time, because the electronic device 100 has been dropped and loses waterproof performance, water tends to enter to cause a short circuit.

In addition, the assembly method provided in this embodiment is to first mount the outer decorative member 42, and then mount the inner decorative member 41. During the mounting of the outer decorative member 42, the rear cover 30 can support the outer decorative member 42. During the mounting of the inner decorative member 41, although being subjected to pressure, the outer decorative member 42 is kept from moving downward under the support of the working bench jig 90, so that the bonding layer 70 is kept from falling off from the outer decorative member 42 or the rear cover 30. In this way, on one hand, the outer decorative member 42 mounted in place is kept from falling off from the through hole 31, which helps to avoid the impact of the subsequent mounting steps on the stability of the mounted outer decorative member 42. In another aspect, the bonding layer 70 is kept from falling off from the outer decorative member 42 or the rear cover 30, and the subsequent mounting steps does not affect the sealing performance of the bonding layer 70, so that the rear cover 30 and the camera decorative member 40 assembled together can implement waterproofing.

Figure 17:
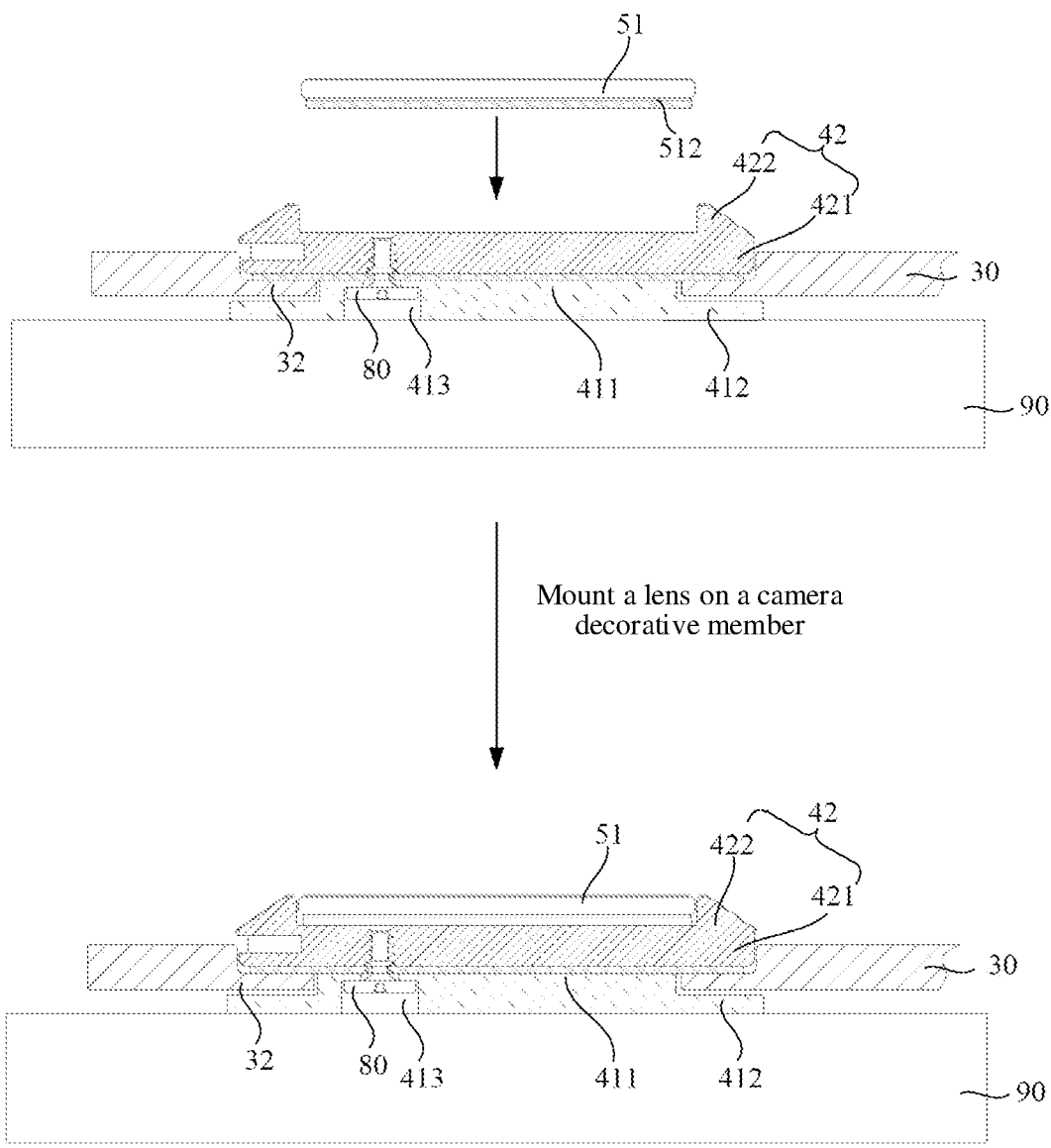
FIG. 17 is a schematic diagram of a lens being mounted on a camera decorative member according to an embodiment of this application.

After step S103, the assembly method provided in this embodiment may further include the following steps:

Step S104: Provide a lens 51, where the lens 51 is mounted on the second structural member 421 of the outer decorative member 42, and the appearance member 422 of the outer decorative member 42 is arranged surrounding the lens 51. FIG. 17 schematically shows an assembly process of the lens 51 and the outer decorative member 42. Referring to FIG. 17, the purpose of this step is to connect the lens 51 to the outer decorative members 42. In this way, compared with connecting the lens 51 to the outer decorative member 42 before step S103, the lens 51 fixed on the outer decorative member 42 is prevented from being pressed by the working bench jig 90 when the inner decorative member 41 is mounted on the rear cover 30, thereby keeping the lens 51 from damage.

It should be noted that, when step S104 is performed, it is necessary to flip the rear cover 30 in step S103 by 180°, so that the rear cover 30 returns to the horizontal posture with the inner surface facing the ground and the outer surface facing away from the ground. In this way, the outer decorative member 42 is located above the rear cover 30, so that the lens 51 can be mounted on the outer decorative member 42 from top to bottom.

It should be noted that, the execution sequence of the above steps should be determined according to functions and internal logic of the steps, and should not be construed as any limitation on the implementation process of the embodiments of this application.

In the embodiments of this application, it should be noted that, unless specified or limited otherwise, the terms "mounting", "connected", and "connecting" should be understood broadly, for example, which may be a fixed connection, an indirect connection through an intermediary, or internal communication inside two components or an interaction relationship between two components. A person of ordinary skill in the art may understand the specific meanings of the foregoing terms in the embodiments of this application according to specific situations. In this specification, the claims, and the accompanying drawings of the embodiments of this application, the terms "first", "second", "third", and the like are intended to distinguish similar objects but do not necessarily indicate a specific order or sequence.

Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, product, or device.

Finally, it should be noted that: the above embodiments are merely used for describing the technical solutions of the embodiments of this application, but are not intended to limit the embodiments of this application. Although the embodiments of this application are described in detail with reference to the foregoing embodiments, it should be appreciated by a person of ordinary skill in the art that, modifications may still be made to the technical solutions recorded in the foregoing embodiments, or equivalent replacements may be made to some or all of the technical features; and these modifications or replacements do not cause the essence of corresponding technical solutions to depart from the scope of the technical solutions in the embodiments of this application.

What is claimed is:

1. An electronic device, comprising:
  a middle frame;
  a rear cover, wherein the rear cover is arranged on a side of the middle frame, a through hole is provided in the rear cover, and an inner wall of the through hole protrudes toward a center of the through hole to form an annular flange; and
  a camera decorative member, wherein the camera decorative member comprises an inner decorative member and an outer decorative member, the outer decorative member is mounted on a side of the annular flange facing away from the middle frame, a part of the outer decorative member is arranged in the through hole and is connected to the annular flange by a bonding layer, and a part of the inner decorative member is arranged in the through hole and is fastened to a side of the outer decorative member facing the middle frame.

2. The electronic device according to claim 1, wherein the inner decorative member comprises a first structural member and an extension edge, the extension edge is connected to a surrounding edge of the first structural member, and a thickness of the first structural member is greater than a thickness of the extension edge; and
  the first structural member protrudes into an inner hole defined by the annular flange and is connected to the outer decorative member, and the extension edge is opposite to a surface of the annular flange facing the middle frame.

3. The electronic device according to claim 2, wherein a first gap is provided between the first structural member and an inner wall of the annular flange.

4. The electronic device according to claim 3, wherein a second gap is provided between the extension edge and the surface of the annular flange facing the middle frame.

5. The electronic device according to claim 3, wherein the first gap is greater than or equal to 0.05 mm and less than or equal to 0.2 mm.

6. The electronic device according to claim 1, wherein the outer decorative member comprises a second structural member and an appearance member, and the appearance member is connected to a surrounding edge of the second structural member and is arranged protruding toward a side facing away from the middle frame.

7. The electronic device according to claim 6, further comprising a lens, wherein the lens is connected to the second structural member, and the appearance member is arranged surrounding the lens.

8. The electronic device according to claim 1, wherein the outer decorative member is in clearance fit with a hole wall of the through hole.

9. The electronic device according to claim 1, wherein the inner decorative member is connected to the side of the outer decorative member facing the middle frame by an adhesive layer.

10. The electronic device according to claim 1, wherein the inner decorative member is fixedly connected to the outer decorative member by a screw.

11. The electronic device according to claim 10, wherein a plurality of screws are provided, and the plurality of screws are evenly distributed around a center line of the through hole.

12. The electronic device according to claim 11, wherein three screws are provided, and the three screws are distributed in a regular triangle shape.

13. An electronic device assembly method, comprising:
providing a middle frame;
providing a rear cover, the rear cover being arranged on a side of the middle frame, wherein a through hole is provided in the rear cover, and an inner wall of the through hole protrudes toward a center of the through hole to form an annular flange;
providing a camera decorative member, wherein the camera decorative member comprises an inner decorative member and an outer decorative member; arranging the outer decorative member on a side of the rear cover facing away from the middle frame, and connecting the outer decorative member to the annular flange of the rear cover by a bonding layer; and arranging the inner decorative member on a side of the rear cover facing the middle frame, and fastening the inner decorative member to the outer decorative member.

14. The assembly method according to claim 13, wherein the fastening the inner decorative member to the outer decorative member comprises:
providing a plurality of screws, and connecting the inner decorative member to the outer decorative member by the plurality of screws, wherein the plurality of screws are evenly distributed around a center line of the through hole.

15. The assembly method according to claim 14, before the providing a plurality of screws, further comprising: connecting the inner decorative member to the outer decorative member by an adhesive layer.

16. The assembly method according to claim 13, after the fastening the inner decorative member to the outer decorative member, further comprising:
providing a lens, wherein the lens is mounted on a second structural member of the outer decorative member, and an appearance member of the outer decorative member is arranged around the lens.

* * * * *

UNITED STATES PATENT AND TRADEMARK OFFICE
CERTIFICATE OF CORRECTION

| | | |
|---|---|---|
| PATENT NO. | : 12,452,354 B2 | Page 1 of 1 |
| APPLICATION NO. | : 18/251606 | |
| DATED | : October 21, 2025 | |
| INVENTOR(S) | : Ke Ding | |

It is certified that error appears in the above-identified patent and that said Letters Patent is hereby corrected as shown below:

In the Specification

Column 8, Line 46, change "Facts" to --F acts--.

Signed and Sealed this
Eighteenth Day of November, 2025

John A. Squires
*Director of the United States Patent and Trademark Office*